US012591882B2

(12) United States Patent
Sinha et al.

(10) Patent No.: US 12,591,882 B2
(45) Date of Patent: Mar. 31, 2026

(54) METHODS AND SYSTEMS FOR SHARING A CONSENT TOKEN ASSOCIATED WITH A USER CONSENT AMONG APPLICATIONS

(71) Applicant: MASTERCARD INTERNATIONAL INCORPORATED, Purchase, NY (US)

(72) Inventors: Ajay Sinha, Maharashtra (IN); Sachin Kumar Singh, Maharashtra (IN); Kaushal Shetty, Maharashtra (IN)

(73) Assignee: MASTERCARD INTERNATIONALINCORPORATED, Purchase, NY (US)

( * ) Notice: Subject to any disclaimer, the term of this patent is extended or adjusted under 35 U.S.C. 154(b) by 0 days.

(21) Appl. No.: 17/865,077

(22) Filed: Jul. 14, 2022

(65) Prior Publication Data

US 2023/0060068 A1      Feb. 23, 2023

(30) Foreign Application Priority Data

Aug. 17, 2021    (IN) .............................. 202141037244

(51) Int. Cl.
*G06Q 20/38* (2012.01)

(52) U.S. Cl.
CPC ................................ *G06Q 20/3821* (2013.01)

(58) Field of Classification Search
CPC ................................................ G06Q 20/3821
See application file for complete search history.

(56) References Cited

U.S. PATENT DOCUMENTS 9,197,643 B2 * 11/2015 Dunphey ................ H04L 63/08
9,818,111 B2    11/2017 Cronic et al.
(Continued)

FOREIGN PATENT DOCUMENTS

AU        2020101396 A4     8/2020

OTHER PUBLICATIONS

M. Niemiec and W. Kolucka-Szypula, "Federated identity in real-life applications," 2015 European Conference on Networks and Communications (EuCNC), Paris, France, 2015, pp. 492-496, doi: 10.1109/EuCNC.2015.7194124. (Year: 2015).*
(Continued)

*Primary Examiner* — Ryan D Donlon
*Assistant Examiner* — Steven R Chism
(74) *Attorney, Agent, or Firm* — LOZA & LOZA, LLP

(57) ABSTRACT

Embodiments provide methods and systems for sharing a user consent associated with user consent among applications. Method performed by server system includes storing consent token associated with user in a database based upon receiving consent from the user on the first application to utilize user credential data for subsequent transactions in connection with interaction between a user device and a first application service provider. The method includes receiving a request to access the consent token associated from a second application service provider associated with a second application accessible on the user device, determining whether the second application service provider is able to access the consent token associated with the first application based on access level data set by the first application service provider of the first application for accessing the consent token and allowing access of the consent token to the second application based on the determining step.

10 Claims, 13 Drawing Sheets

(56) References Cited

U.S. PATENT DOCUMENTS

| | | | |
|---|---|---|---|
| 9,830,595 | B2 | 11/2017 | Anderson et al. |
| 9,971,908 | B2 * | 5/2018 | Huang .................. G06F 21/604 |
| 10,348,718 | B2 * | 7/2019 | Thakkar .................. G06F 21/00 |
| 10,515,352 | B2 * | 12/2019 | Brudnicki .......... G06Q 20/3574 |
| 10,756,906 | B2 * | 8/2020 | Toth ...................... H04L 9/0894 |
| 10,839,374 | B2 | 11/2020 | McCullagh et al. |
| 2015/0058191 | A1 * | 2/2015 | Khan ................ G06Q 20/4016 |
| | | | 705/35 |
| 2016/0078428 | A1 | 3/2016 | Moser et al. |
| 2016/0314460 | A1 * | 10/2016 | Subramanian ......... G06Q 20/12 |
| 2019/0026738 | A1 * | 1/2019 | Robeen ............... G06Q 20/401 |
| 2019/0034924 | A1 * | 1/2019 | Prabhu .............. G06Q 20/3821 |
| 2019/0220850 | A1 | 7/2019 | Crowe et al. |
| 2019/0236590 | A1 | 8/2019 | Nwokolo et al. |
| 2019/0373320 | A1 * | 12/2019 | Balsamo .............. G06F 1/3215 |
| 2020/0005278 | A1 * | 1/2020 | Vudathu ............. G06Q 20/227 |
| 2020/0097963 | A1 * | 3/2020 | Gomes ............ G06Q 20/38215 |

OTHER PUBLICATIONS

J. Werner, C. M. Westphall, A. A. Vargas and C. B. Westphall, "Privacy Policies Model in Access Control," 2019 IEEE International Systems Conference (SysCon), Orlando, FL, USA, 2019, pp. 1-8, doi: 10.1109/SYSCON.2019.8836759. (Year: 2019).*
Visa's Tokenization Technologies for Better eCommerce Experiences, pp. 2 ( Apr. 8, 2021) https://pixelplex.io/blog/visa-tokenization/.
Tokenization/Vaulting, pp. 2 https://docs.firstdata.com/org/gateway/node/322.
The Masterpass wallet from Mastercard is to be replaced by a single solution, pp. 1 ( Sep. 4, 2020) https://www.archyde.com/the-masterpass-wallet-from-mastercard-is-to-be-replaced-by-a-single-solution/.

* cited by examiner

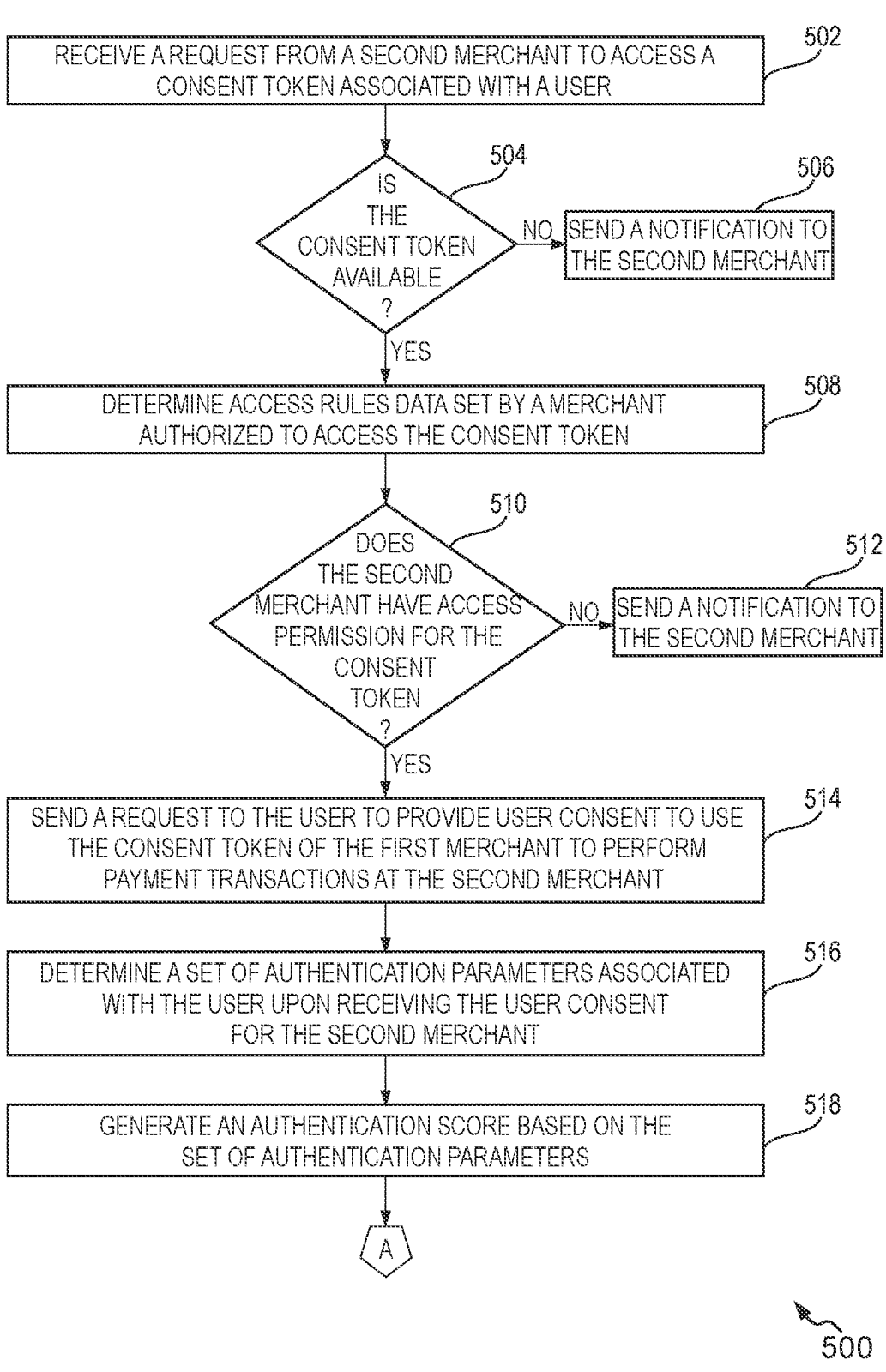

RECEIVE A REQUEST FROM A SECOND MERCHANT TO ACCESS A CONSENT TOKEN ASSOCIATED WITH A USER — 502

IS THE CONSENT TOKEN AVAILABLE ? — 504

NO → SEND A NOTIFICATION TO THE SECOND MERCHANT — 506

YES

DETERMINE ACCESS RULES DATA SET BY A MERCHANT AUTHORIZED TO ACCESS THE CONSENT TOKEN — 508

DOES THE SECOND MERCHANT HAVE ACCESS PERMISSION FOR THE CONSENT TOKEN ? — 510

NO → SEND A NOTIFICATION TO THE SECOND MERCHANT — 512

YES

SEND A REQUEST TO THE USER TO PROVIDE USER CONSENT TO USE THE CONSENT TOKEN OF THE FIRST MERCHANT TO PERFORM PAYMENT TRANSACTIONS AT THE SECOND MERCHANT — 514

DETERMINE A SET OF AUTHENTICATION PARAMETERS ASSOCIATED WITH THE USER UPON RECEIVING THE USER CONSENT FOR THE SECOND MERCHANT — 516

GENERATE AN AUTHENTICATION SCORE BASED ON THE SET OF AUTHENTICATION PARAMETERS — 518

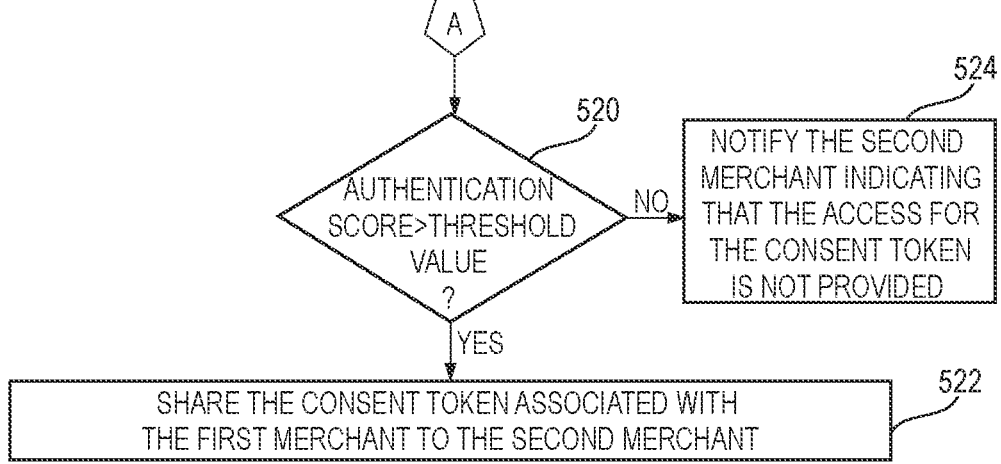
FIG. 5B

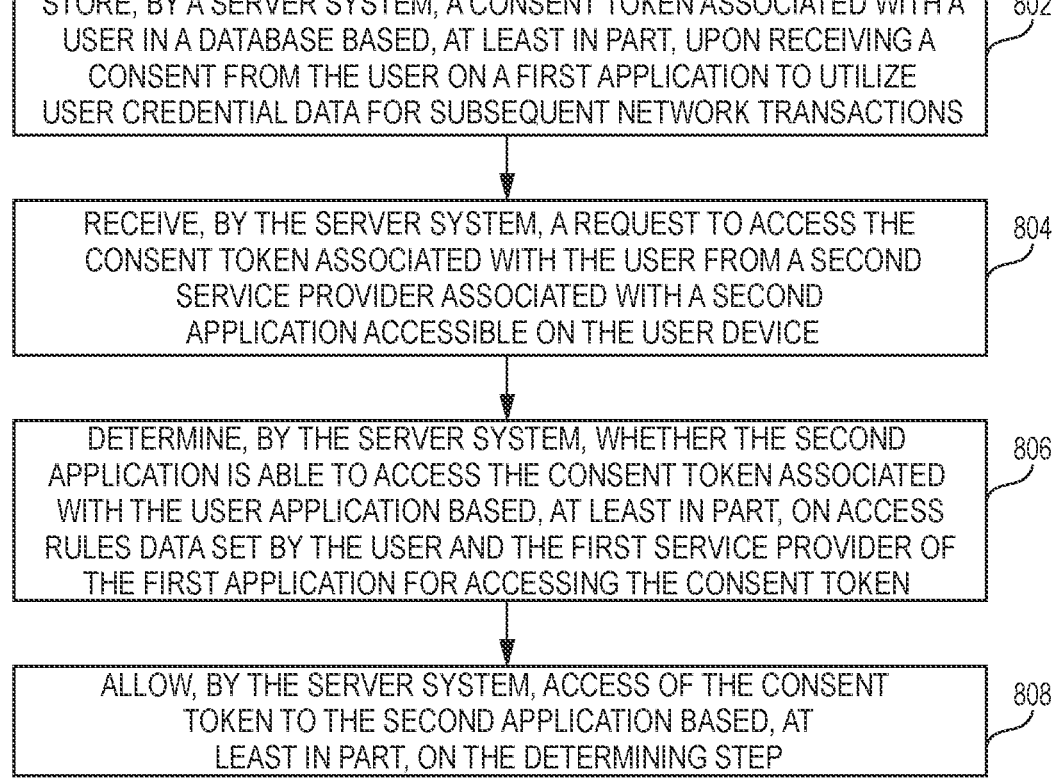

STORE, BY A SERVER SYSTEM, A CONSENT TOKEN ASSOCIATED WITH A USER IN A DATABASE BASED, AT LEAST IN PART, UPON RECEIVING A CONSENT FROM THE USER ON A FIRST APPLICATION TO UTILIZE USER CREDENTIAL DATA FOR SUBSEQUENT NETWORK TRANSACTIONS — 802

RECEIVE, BY THE SERVER SYSTEM, A REQUEST TO ACCESS THE CONSENT TOKEN ASSOCIATED WITH THE USER FROM A SECOND SERVICE PROVIDER ASSOCIATED WITH A SECOND APPLICATION ACCESSIBLE ON THE USER DEVICE — 804

DETERMINE, BY THE SERVER SYSTEM, WHETHER THE SECOND APPLICATION IS ABLE TO ACCESS THE CONSENT TOKEN ASSOCIATED WITH THE USER APPLICATION BASED, AT LEAST IN PART, ON ACCESS RULES DATA SET BY THE USER AND THE FIRST SERVICE PROVIDER OF THE FIRST APPLICATION FOR ACCESSING THE CONSENT TOKEN — 806

ALLOW, BY THE SERVER SYSTEM, ACCESS OF THE CONSENT TOKEN TO THE SECOND APPLICATION BASED, AT LEAST IN PART, ON THE DETERMINING STEP — 808

METHODS AND SYSTEMS FOR SHARING A CONSENT TOKEN ASSOCIATED WITH A USER CONSENT AMONG APPLICATIONS

CROSS-REFERENCE TO RELATED APPLICATION

The present application for Patents claims priority to India Patent Application number 202141037244, filed Aug. 17, 2021, and which is incorporated by reference hereto, and which also assigned to assignee hereof.

TECHNICAL FIELD

The present disclosure relates to electronic tokenization systems and, more particularly relates to, electronic methods and systems for sharing consent tokens associated with user consents among applications accessible on a user device of a user.

BACKGROUND

Various applications are available on user devices that provide an option to users to give consent or permission for storing sensitive data (such as, payment credential data) on the various applications and make the sensitive data available to the users for future transactions so that the users are not required to re-enter the sensitive data.

In one exemplary scenario, while purchasing products (e.g., goods or services, etc.) from multiple merchants (such as e-commerce applications, merchant websites, etc.), a customer may present payment credential data or other sensitive data at multiple merchants. The customer also has an option to provide his/her payment credential data with a set of merchants to maintain or store the payment credential data or other sensitive data in a database associated with a payment network, where the payment credential data can be utilized for future purchase transactions at the set of merchants. For storing the payment credential data, the set of merchants needs to send consent verification requests to verify the provided user consent for using the payment credential data, to an issuer via the payment network and respective acquirers associated with the set of merchants. Upon successful consent verifications, the set of merchants can utilize the payment credential data of the customer in connection with the customer for future transactions.

Since each merchant is required to send a separate consent verification request to the payment network for consent verifications, a number of consent verification requests at the payment network increases that results in high network traffic at the payment network. Further, there would be multiple copies of the same payment credential data created in the storage, which leads to high memory consumptions.

Thus, there exists a technological need to overcome the above-stated limitations.

SUMMARY

Various embodiments of the present disclosure provide systems and methods for sharing a consent token associated with a user consent among applications installed or accessible on a user device of a user.

In an embodiment, a computer-implemented method is disclosed. The computer-implemented method performed by a server system includes storing a consent token associated with a user in a database based, at least in part, upon receiving a consent from a user on a first application to utilize user credential data for subsequent network transactions. The computer-implemented method includes receiving a request to access the consent token associated with the user from a second application service provider associated with a second application accessible on the user device. The computer-implemented method includes determining whether the second application service provider is able to access the consent token associated with the first application based, at least in part, on access rules data set by the first application service provider of the first application for accessing the consent token. Further, the computer-implemented method includes allowing access of the consent token to the second application based, at least in part, on the determining step.

BRIEF DESCRIPTION OF THE FIGURES

For a more complete understanding of example embodiments of the present technology, reference is now made to the following descriptions taken in connection with the accompanying drawings in which:

FIGS. 5A and 5B, collectively, represent a sequence flow diagram for a process flow of consent exchange or switching process among merchant applications of a plurality of merchants, in accordance with an embodiment of the present disclosure;

FIG. 8 is a flow diagram of a computer-implemented method for managing user consents among a plurality of applications installed on a user device, in accordance with an embodiment of the present disclosure;

Figure 1:
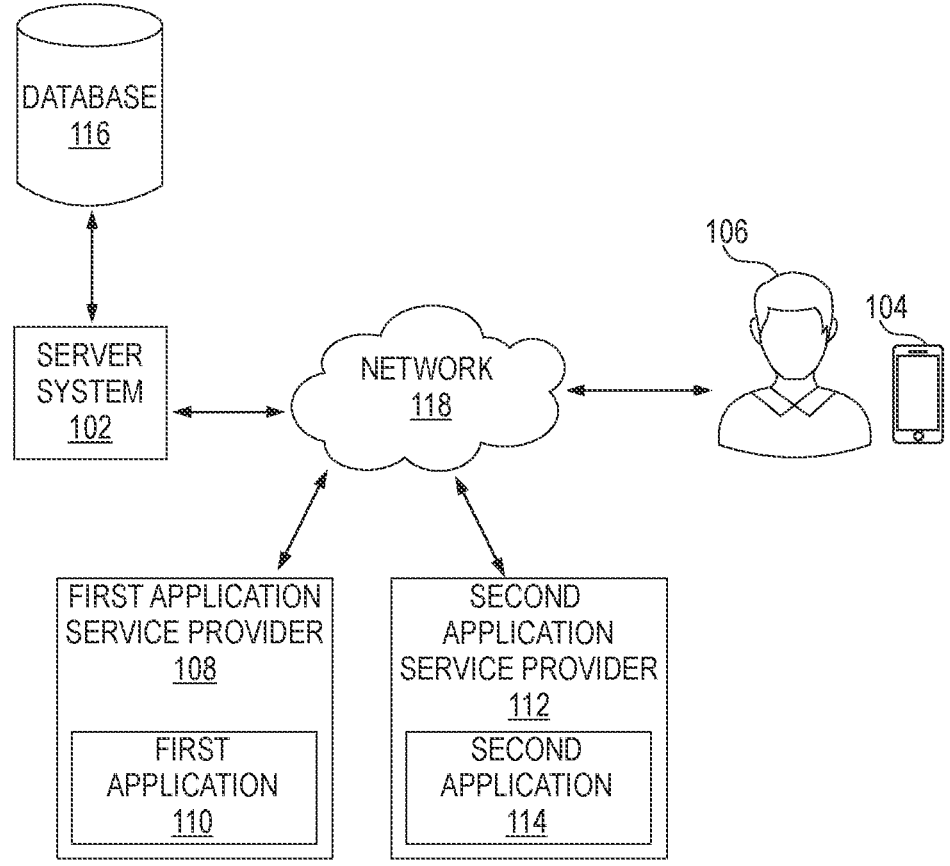
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called as an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server system called as "issuer server" throughout the description.

Further, the term "acquirer" is an organization that transmits a purchase transaction to a payment card system for routing to the issuer of the payment card account in question. Typically, the acquirer has an agreement with merchants, wherein the acquirer receives authorization requests for purchase transactions from the merchants, and routes the authorization requests to the issuers of the payment cards being used for the purchase transactions. The terms "acquirer", "acquiring bank", "acquiring bank" or "acquirer bank" will be used interchangeably herein. Further, one or more server systems associated with the acquirer are referred to as "acquirer server" to carry out its functions.

The term "payment account" used throughout the description refers to a financial account that is used to fund the financial transaction (interchangeably referred to as "payment transaction"). Examples of the payment account include, but are not limited to a savings account, a credit account, an e-wallet account, a checking account and a virtual payment account. The payment account may be associated with an entity such as an individual person, a family, a commercial entity, a company, a corporation, a governmental entity, a non-profit organization and the like.

In some scenarios, a payment account may be a virtual or temporary payment account that can be mapped or linked to a primary payment account, such as those accounts managed by payment wallet service providers.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be operated to perform transactions via cash-substitutes, which may include payment cards, letters of credit, checks, financial accounts, etc. One example of a payment network includes those operated by Mastercard.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data (e.g., a digital token) stored in a user device, where the data is associated with the payment account such that the data can be used to process the financial transaction between the payment account and a merchant's financial account.

The term "Tokenization", used throughout the description, refers to a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (i.e., token). Tokenization may be used to enhance transaction efficiency, improve transaction security, increase service transparency, or to provide a method for third-party enablement.

The term "merchant", used throughout the description, may include a merchant that has a relationship with the payment processing network. The merchant may receive the proceeds from a purchase when the purchase is settled. The merchant is the company that is ultimately responsible for the financial transaction.

A "merchant application", used throughout the description, may be associated with a particular merchant or may be associated with a number of different merchants and may be capable of identifying a particular merchant (or multiple merchants) which are parties to a transaction. For instance, the merchant application may store information identifying a particular merchant server computer that is configured to provide purchase environment in which the merchant server computer is capable of processing remote transactions initiated by the merchant application. Further, the merchant application may also include a general purpose browser or other software designed application to interact with multiple merchant server computers as long as the browser is configured to identify the merchant server computer and process a remote transaction. The merchant application may be installed on general purpose memory of a mobile device.

A "payment service provider" may include an entity that contracts with an acquirer for the purpose of providing acceptance to a sponsored merchant, the sponsored merchant then contracts with a payment service provider to obtain payment services.

A "token" may include a substitute for an account identifier such as a primary account number. Tokens are used in lieu of the primary account number and can be used to generate original and subsequent transactions for an entire transaction lifecycle. A token may be in a format that is similar to a primary account number. For example, if a real primary account number has 16 digits, then a corresponding payment token may also have 16 digits. In some embodiments, a token may also be in a different format than a primary account number. A token may also be referred to as a "temporary credential."

Overview

Various example embodiments of the present disclosure provide methods, systems, user devices, and computer program products for generating sharable user consent between applications used by the user, wherein the sharable user consent is originally generated or created for one application. The user consent can take any form, and without limitation, it primarily includes a consent token associated with user-specific data to carry out any action such as a payment transaction using a payment instrument of the user. For instance, the user consent may be an authorization to use stored profile data of the user or information of a payment instrument associated with the user.

Upon generation of the user consent for an application, say Application 1, the user consent (i.e. the consent token) is stored at a database associated with a server system that manages the user consent. As the user consent is stored for the Application 1, the Application 1 can perform the future transactions using the already stored user consent without having a need to ask the user to provide the consent again. Further, when the user initiates usage of another application, say Application 2, that also needs the user consent, the server system is configured to allow the Application 2 to use the already stored user consent with the database based on the consent provided by the Application 1.

Embodiments of the present disclosure enable the server system to allow Application 2 to use the consent token based on some pre-defined conditions. In at least one example embodiment, the server system enables the Application 2 to use the user consent based on an access rules data set by the user and/or the Application 1, and express consent of the Application 1 to share the user consent with the Application 2. Examples of the access rules may be a threshold amount for a transaction, a time-duration of validity of consent for other applications, geographical location of server of the Application 2, a type and category of the Application 2, a credit score of the Application 2, etc.

Additionally, in at least some examples, the server system also considers an authentication score based on the set of authentication parameters associated with the user before allowing the Application 2 to access the user consent previously generated for the Application 1. Examples of the set of authentication parameters include device profile data (e.g., device location, device identifier, device health, counts of login attempts on any financial applications, etc.), user authentication data (e.g., physical biometric data, out-of-band information, email data, SMS data, phone call data, and phone data, etc.), user behavior data (e.g., application installation data, application update data, user consent behavior data, etc.).

Various embodiments of the present disclosure offer multiple technical advantages and technical effects. For instance, the present disclosure allows reduction in consent related traffic on payment network, better utilization of cloud resources, and processing more number of transactions. The present disclosure gives a consent for one merchant, which is internally exchanged across participating merchants and PSPs and allow a user to perform transaction on any merchant without whole consent enrolment process. Hence, there is no need to store multiple consents for the user for the same payment credential data, resulting in reduced database requirements at the payment network. The present disclosure enables users to perform payment transaction at different merchant applications without providing the payment credential data in real-time.

Various example embodiments of the present disclosure are described hereinafter with reference to FIGS. 1 to 12.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, managing user consents and verifying sharing of user consents among a plurality of applications installed on a user device. The environment 100 generally includes a server system 102, a user device 104 associated with a user 106, a first application service provider 108 associated with a first application 110, a second application service provider 112 associated with a second application 114, each coupled to, and in communication with a network 118. The network 118 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof. For example, the network 118 may include multiple different networks, such as a private network made accessible by the server system 102 and a public network (e.g., the Internet etc.) through which the server system 102, the first application service provider 108, and the user device 104 may communicate.

In one embodiment, the user 106 may be any individual, representative of a corporate entity, non-profit organization, or any other person. Examples of the user device 104 may include, without limitation, smart phone, tablet computer, other handheld computers, wearable devices, laptop computers, desktop computers, servers, portable media players, gaming devices, and so forth. In one embodiment, the first application 110 and the second application 114 are accessible on the user device 104.

The first application 110 may allow the user 106 to interact with the first application service provider 112 for services such as to store, access, and/or manage data services, develop and/or deploy computer applications, and/or host web content. The one or more application service providers, arranged in a cluster of servers or as a server farm, may host the first application 110.

In one embodiment, the user 106 may provide his/her user consent for personal identifiable information (PII) on the first application 110 to be stored at a database 116. Hence, there may not be a need to provide the PII for accessing a particular service on the first application in the future. In other words, the user 106 can perform a network transaction (i.e., accessing a particular service on the first application 110) without having any need to provide the PII.

In one embodiment, the server system 102 is configured to perform one or more operations described herein. In one example, the server system 102 is a consent management platform. The server system 102 is a separate part of the environment 100, and may operate apart from (but still in communication with, for example, via the network 118) any third party external servers (to access data to perform the various operations described herein). However, in other embodiments, the server system 102 may actually be incorporated, in whole or in part, into one or more parts of the environment 100. In addition, the server system 102 should be understood to be embodied in at least one computing device in communication with the network 118, which may be specifically configured, via executable instructions, to perform as described herein, and/or embodied in at least one non-transitory computer readable media.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
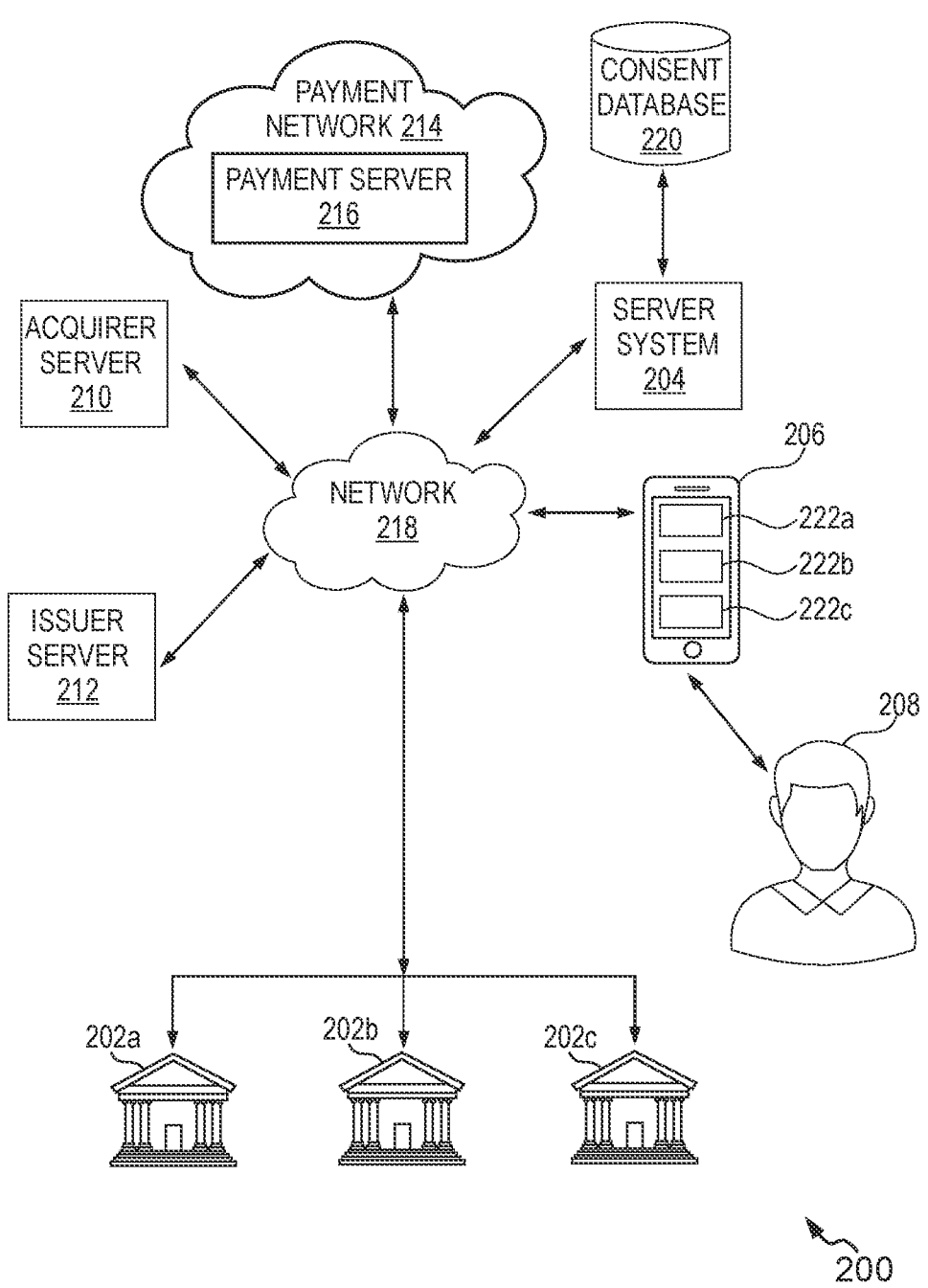
FIG. 2 is an example representation of an environment, related to at least some example embodiments of the present disclosure.

FIG. 2 illustrates an example representation of an environment 200 related to at least some example embodiments of the present disclosure. Although the environment 200 is presented in one arrangement, other embodiments may include the parts of the environment 200 (or other parts) arranged otherwise depending on, for example, facilitating payment transactions using consent verification and user authentication at one or more merchant applications. The environment 200 generally includes a plurality of merchants 202a, 202b, and 202c, a server system 204, a user device 206 associated with a user 208, an acquirer server 210, an issuer server 212, a payment network 214 including a payment server 216, each coupled to, and in communication with a network 218. The network 218 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 200 may connect to the network 218 in accordance with various wired and wireless communication protocols, such as Transmission Control Protocol and Internet Protocol (TCP/IP). User Datagram Protocol (UDP), 2nd Generation (20), 3rd Generation (3G), 4th Generation (4G), 5th Generation (5G) communication protocols, Long Term Evolution (LTE) communication protocols, future communication protocols or any combination thereof. For example, the network 218 may include multiple different networks, such as a private network made accessible by the server system 204 and a public network (e.g., the Internet etc.) through which the server system 204, the plurality of merchants 202a-202c, the payment server 216, and the issuer server 212 may communicate.

In one embodiment, the merchants 202a-202c may be associated with a single payment service provider (e.g., payment gateway application) who manages the financial transactions for the merchants 202a-202c.

The user device 206 (similar to the user device 104 as shown in the FIG. 1) may include any electronic computing device. Examples of the user device 104 include, but are not limited to, a desktop computer and a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The user device 206 may be installed with a plurality of merchant applications associated with a set of merchants and/or mobile payment applications. For example, the user device 206 has installed a merchant application 222a associated with the merchant 202a (interchangeably described as "first merchant", throughout the description) a merchant application 222b associated with the second merchant 202b (interchangeably described as "second merchant", throughout the description) and a merchant application 222c associated with the merchant 222c. Each merchant application may include any mobile program, software, or other suitable executable code suitable to conduct a payment transaction. In some embodiments, merchant application may be a merchant-specific application. In other embodiments, merchant application may be a general purpose application, such as a web browser. Further, merchant application may be associated with parties that are not merchants and instead process payments on behalf of merchants or other service providers (e.g., payment service providers, acquirers, etc.).

Examples of a merchant (e.g., first merchant 202a) may include a merchant application service provider associated with the merchant application (e.g., merchant application 222a) of a merchant entity. The "merchant entity" is an entity that engages in transactions and can sell goods and services. Examples of the merchant entity may include e-commerce merchants, online retailers, online food delivery platforms, online supermarket or any business establishments, and/or private agencies where customers can perform purchase transactions on the merchant application in exchange for any goods and/or services or any transaction that requires financial transaction between customers and the merchant 122.

In one embodiment, the acquirer server 210 is associated with a financial institution (e.g., a bank) that processes financial transactions. This can be an institution that facilitates the processing of payment transactions for merchants or an institution that owns platforms that make online purchases or purchases made via software applications possible (e.g., shopping cart platform providers and in-app payment processing providers). The terms "acquirer", "acquirer bank", "acquiring bank" or "acquirer server" will be used interchangeably herein.

In one embodiment, the issuer server 212 is a financial institution that manages accounts of multiple users. Account details of the accounts established with the issuer bank are stored in PAN profiles of the users such as user 206 in a memory of the issuer server 212 or on a cloud server associated with the issuer server 212. The terms "issuer server", "issuer", or "issuing bank" will be used interchangeably herein.

In one non-limiting example, when the user 208 browses products at a merchant application associated with the merchant 202a (e.g., via the merchant's website, etc.), the user 208 may decide to purchase one or more products. To do so, the user 208 may interact with the merchant 202a, via the merchant application, in a variety of manners, but, ultimately, at some point, selects, to fund a purchase for the product(s) by providing the payment credential data on the merchant application and perform authentication process.

In one embodiment, the merchant 202a receives the payment credential data (such as, primary account number, authentication details, etc.) from the user 206. To reduce number of steps for next check-out process on the merchant application, the merchant can provide an option to the user 202a to register his/her consent to utilize the same payment credential data for future purchase transactions.

To register such user consents, the merchant 202a needs to send personal profile, card profile and device profile data of the user 206 to the payment server 216 associated with the payment network 214 (for example, Mastercard® payment system interchange network). The payment server 216 processes the consent verification request associated with the user 208 and stores the user consent associated with the user 208 for facilitating future purchase transactions on the merchant application initiated by the user device 206 based upon the consent verification. The payment server 216 may specifically send the consent registration request to the associated acquirer and issuer via Mastercard®3DS service layer and store the user consent in a consent directory server.

In one embodiment, the payment server 216 may be used by the payment cards issuing authorities as an interchange payment network. Examples of interchange payment network include, but are not limited to, Mastercard® payment system interchange network. The Mastercard® payment system interchange network is a proprietary communications standard promulgated by Mastercard International Incorporated® for the exchange of financial transaction data between two entities that are members of Mastercard International Incorporated®. (Mastercard is a registered trademark of Mastercard International Incorporated located in Purchase, N.Y.).

In an otherwise example scenario (i.e., not in accordance with present disclosure), when the user 208 desires to store the user consent with respect to the second merchant 202b, the user 208 may be required to perform the consent verification again for the second merchant 202b. Such repetitive verification and consent storage can increase a number of consent verification requests at the payment network for the same payment credential data, resulting in high network resource consumptions. It should be noted that such issues are solved by the various embodiments of the present disclosure described herein.

In some other examples (i.e., not in accordance with present disclosure), consider that the user 208 has already given consents for 3 different merchants applications (merchant application 1, merchant application 3 & merchant application 3), then any of the following scenarios may occur:

The user device (e.g., a smartphone) got formatted, and all the applications got re-installed again on the user device, User purchased a new user device and installed all these apps 1st time, Application updates of merchant application 1 to 3, pushed by respective merchants 1 to 3 triggering re-installation of corresponding applications in the user device, The user decides to transact with a different Payment Service Provider (PSP) other than the one the had got the consent for.

In the above described example scenarios (as per existing solutions, and not per the embodiments of the present disclosure), whole consent registration and verification are performed again and again, resulting into flooding the payment network with tons of requests. Such phenomenon causes excessive space utilization, and network sub-par performance because of more traffic, thereby decreasing the average number of consent or transactions processed via the payment network.

To solve the above problem, the environment 200 is depicted to include the server system 204 which is configured to perform one or more of the operations described herein. In one example, the server system 204 is embodied with the payment network 214. In one embodiment, the server system 204 is a consent management platform that is configured to perform three high-level processes, namely, (a) bi-directional consent registration or enrolment process, (b) consent switching process, and (c) behavioral consent evaluation process.

The 'bi-directional consent registration' process is a process in which the server system 204 generates a consent token upon receiving user consent and merchant consent messages. The user consent message indicates that the user is authorizing a merchant to retrieve up to a limited payment amount from the payment account of the user. The merchant consent message indicates that the merchant, who has received the user consent for facilitating future payment transactions, is allowed sharing of the user consent with a set of merchant applications. For example, suppose, the user 'A' provides his/her user consent to the merchant 'XYZ' to use the payment credential data for next time of transactions. The merchant 'XYZ' can also set its merchant consent i.e., access permissions of the same user consent with other merchant applications installed on the user device. Thus, by using the bi-directional consent registration process, consents from both the merchant and the user are captured in behavioral consent evaluation algorithm to not only make the user consent available to other merchant applications, but also to help in identifying fraud.

The 'consent switching' is a process in which the consent token associated with the user and the first merchant can be shared with other merchant applications installed on the user device based upon the user's approval and a set of authentication parameters captured using the behavioral consent evaluation process.

The 'behavioral consent evaluation' process is a process in which a set of authentication parameters is calculated to determine whether already-stored consent token associated with the user for the one merchant application can be shared with another merchant application installed on the user device or not.

Figure 3A:
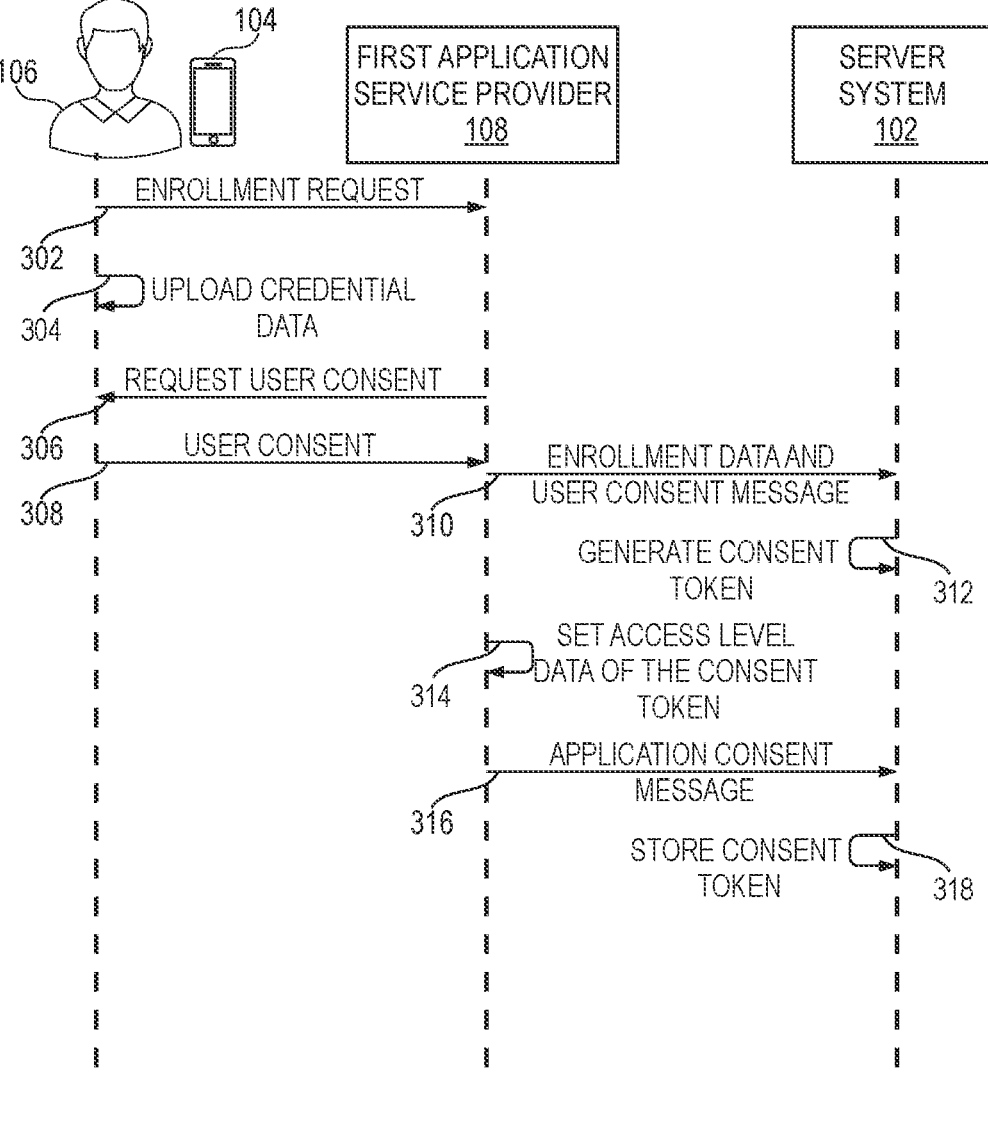
FIG. 3A is a sequence flow diagram for consent enrolment process, in accordance with an example embodiment of the present disclosure.

FIG. 3A represents a sequence flow diagram 300 for consent enrolment process, in accordance with an example embodiment of the present disclosure. The sequence of operations of the sequence flow diagram 300 may not be necessarily executed in the same order as they are presented. Further, one or more operations may be grouped together and performed in form of a single step, or one operation may have several sub-steps that may be performed in parallel or in a sequential manner.

At 302, the first application service provider 108 receives an enrollment request from the user 106. The enrollment request is sent by the user 106 to the first application service provider 108 using a first application. The enrollment request includes a request from the user 106 to first application service provider 108 associated with the first application for enrolling the user 106 for accessing the service provided by the first application service provider 108. A non-limiting example of the first application service provider 108 can be a merchant application 1.

At 304, the user 106 uploads user credential data through the first application associated with the first application service provider 108. The user credential data includes user information such as, but not limited to, a user id, a password, a primary account number (PAN one or more parameters), a name, an address, a phone number, a city, a postal code, and the like uploaded by the user 106 through the first application in order to enroll the user 106 with the first application associated with the first application service provider 108 to access their services.

At 306, the first application service provider 108 requests the user 106 for a user consent message for storing the user credential data at the server system 102 for using the user credential data for subsequent services. The user consent message is provided by the user 106 through at least one of a message, a checkbox, and a button in the first application, allowing the first application service provider 108 associated with the first application to store the user credential data at the server system 102.

At 308, upon requested by the first application service provider 108, the user 106 provides the first application service provider 108 with the user consent message through at least one of a message, a checkbox, and a button. The user consent allows the first application service provider 108 associated with the first application to store the user credential data at the server system 102.

At 310, the first application service provider 108 sends the enrollment data and the user consent message provided by the user 106 to the server system 102. The user consent message is used for future or subsequent services the user may use as offered by the first application associated with the first application service provider 108. The enrollment data may, without limitation, include user's enrollment ID, user preferences, first application service provider ID, and timestamp.

At 312, the server system 102 generates a consent token associated with the enrollment data and the user consent message provided by the first application service provider 108. The consent token includes user's enrollment ID, user preferences, first application service provider ID, timestamp provided by the first application service provider 108, and the user consent message.

At 314, the first application service provider 108 sets access level data of the consent token.

At 316, the first application service provider 108 provides an application consent message to the server system 102. The application consent message includes a consent message from the first application service provider 108 for sharing the consent token with the other applications associated with the application service providers.

At 318, the server system 102 stores the consent token in the database 116 upon receiving the application consent message from the first application service provider 108.

Figure 3B:
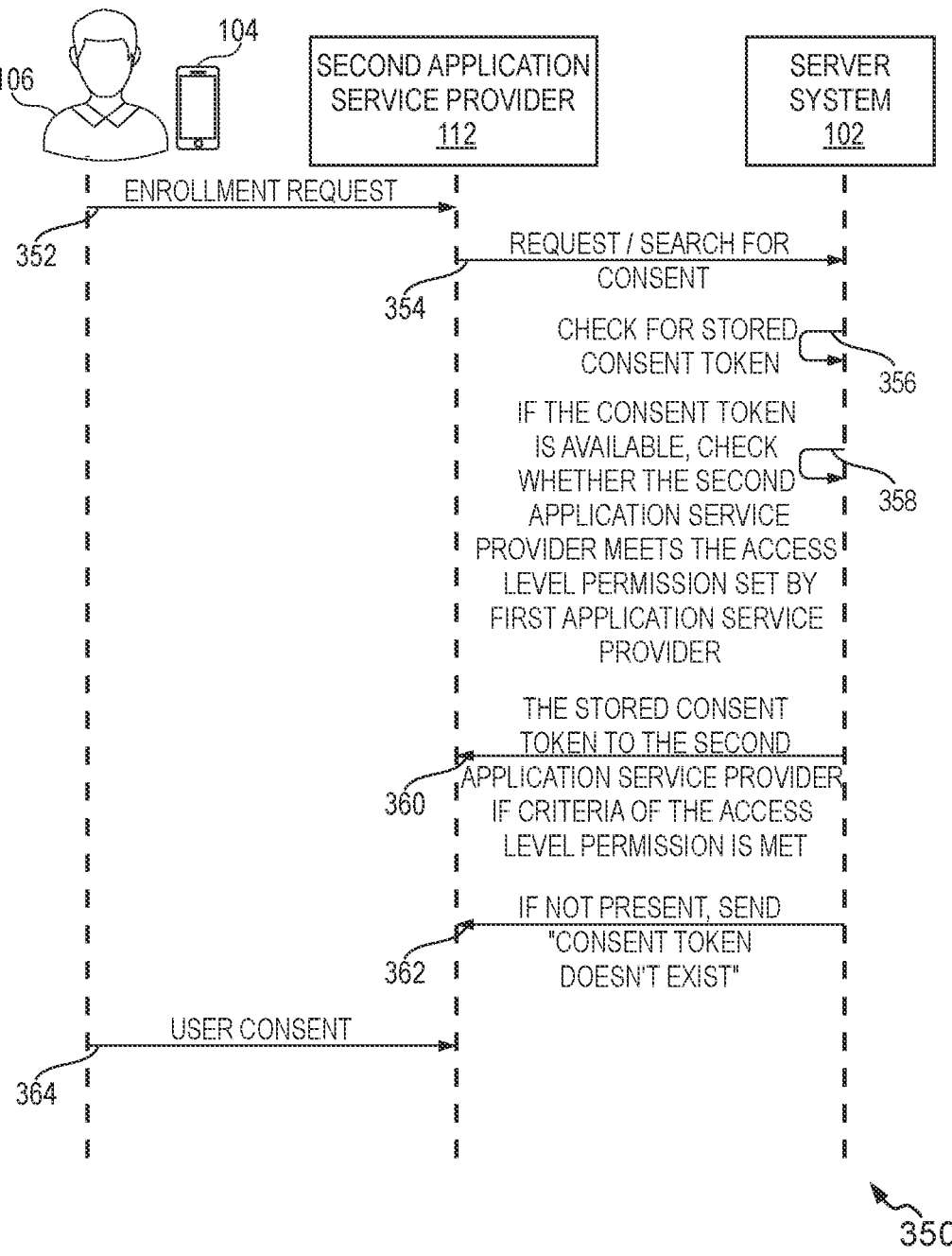
FIG. 3B is a sequence flow diagram for consent sharing and switching process among applications installed on a user device, in accordance with an example embodiment of the present disclosure.

FIG. 3B represents a sequence flow diagram 350 for consent sharing and switching process among applications installed on a user device, in accordance with an example embodiment of the present disclosure. The sequence of operations of the sequence flow diagram 350 may not be necessarily executed in the same order as they are presented. Further, one or more operations may be grouped together and performed in form of a single step, or one operation may have several sub-steps that may be performed in parallel or in a sequential manner.

At 352, the second application service provider 112 receives an enrollment request from the user 106. The enrollment request is sent by the user 106 to the second application service provider 108 using a second application. The enrollment request includes a request from user 106 to the second application service provider 112 associated with the second application for enrolling the user 106 for accessing the service provided by the second application service provider 112.

At 354, upon receiving the enrollment request, the second application service provider 112 requests the server system 102 to search for consent token stored in the database. The consent token includes the user's enrollment ID, the user preferences, the first application service provider ID, the timestamp, and the user consent message as gathered and stored by the server system 102.

At 356, the server system 102 searches its database for any previously stored consent token that was generated previously by the server system 102 while enrolling the user 106 using the first application with the first application service provider 108.

At 358, if the server system 102 finds the consent token stored in its database, the server system 102 then determines if the second application service provider 112 meets the criteria for access level permission set by the first application service provider 108.

At 360, the server system 102 provides the stored consent token to the second application service provider 112 if the second application service provider 112 meets the criteria for the access level permission set by the first application service provider 108.

At 362, if there is no consent token stored at the server system 102 for the user 106 or if the second application service provider 112 does not meet the access level permission criteria as set by the first application service provider 108, the server system returns a message stating that the consent token does not exist for the second application service provider 112.

At 364, the second application service provider 112 can access the user consent for subsequent transactions whenever the user 106 wishes to the use the second application.

Figure 4:
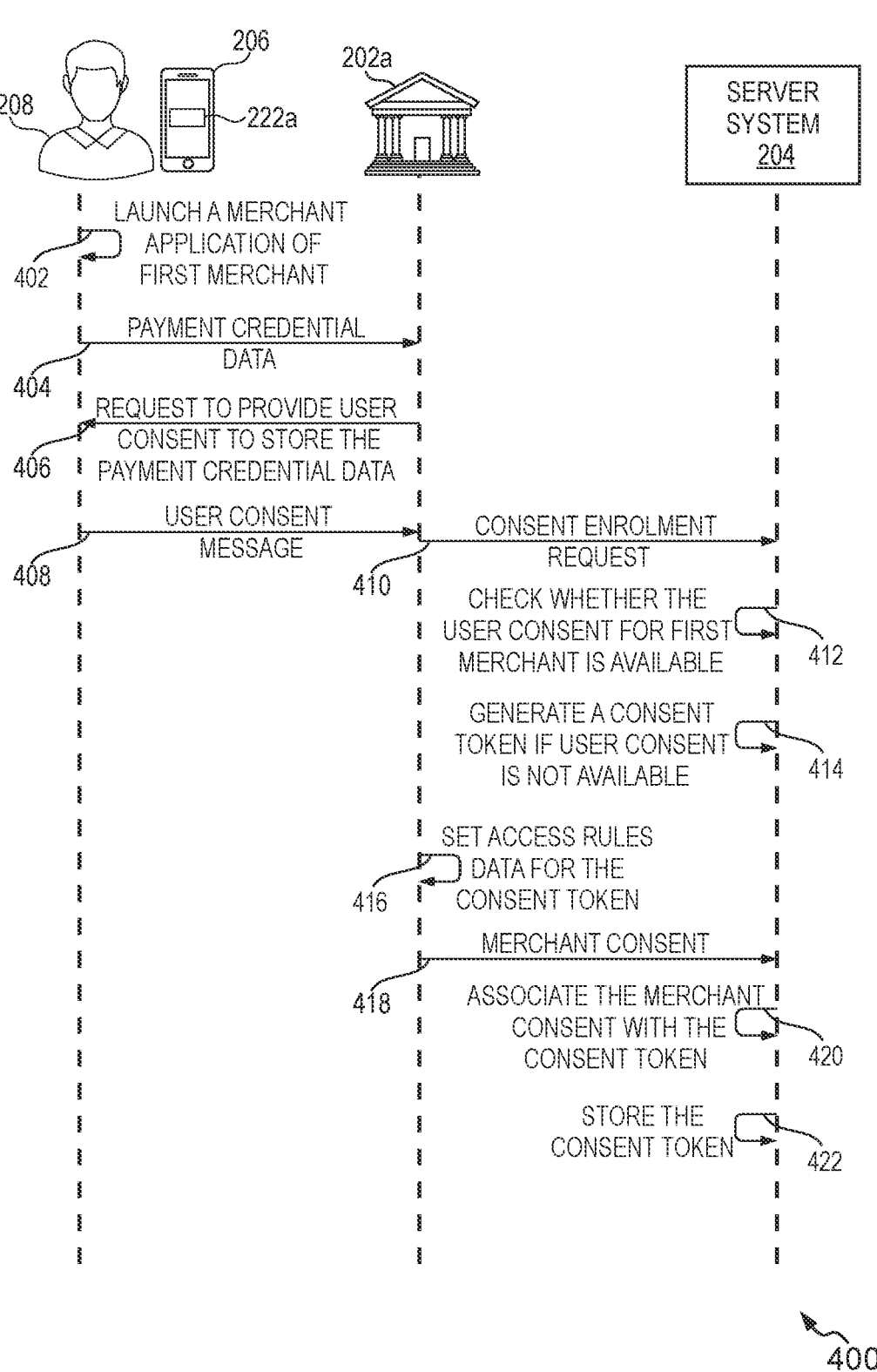
FIG. 4 is a sequence flow diagram for a process flow of consent enrolment process, in accordance with an embodiment of the present disclosure.

FIG. 4 represents a sequence flow diagram 400 for a process flow of consent enrolment process, in accordance with an embodiment of the present disclosure. The sequence of operations of the sequence flow diagram 400 may not be necessarily executed in the same order as they are presented. Further, one or more operations may be grouped together and performed in form of a single step, or one operation may have several sub-steps that may be performed in parallel or in a sequential manner.

At 402, the user 208 may access or launch a merchant application associated with a first merchant 202a on his/her user device 206. Specifically, the user 208 may access the merchant application associated with the first merchant 202*a* on the user device 206 and then log in and/or otherwise authenticate himself/herself to the application for example, via a username, password, biometric, code, etc.

At 404, the user 208 provides payment credential data for the user's payment account (e.g., a primary account number (PAN) along with other information (e.g., a shipping address, etc.)). In other words, the application associated with the first merchant 202*a* is configured to provide an option for the user 208 to enter the payment credential data that can be stored on a database associated with the payment network 214 for facilitating subsequent payment transactions at the first merchant 202*a*.

At 406, the first merchant 202*a* requests the user 208 to provide user consent to store the payment credential data at a payment server 214 or at the database associated with server system 204 for facilitating subsequent payment transactions without user interaction.

At 408, the user 208 sends a user consent message to authorize the first merchant 202*a* to retrieve a limited payment amount from the payment account of the user, and also to store all associated information at the payment server. The user consent message may be provided by the user 208 through at least one of a message, a checkbox, and a button through the first merchant application 222*a* for allowing the first merchant 202*a* associated with the first merchant application 222*a* to store the user credential data at the payment server 216.

At 410, the first merchant 202*a* sends a consent enrolment request to the server system 204. The consent enrolment message includes, but is not limited to, the user consent message and the payment credential data of the user 208.

At 412, the server system 204 queries the consent database 220 to check whether the user 208 has already provided a user consent for authorizing the first merchant 202*a* to use the payment credential data for payment transactions or not.

At 414, if the user consent is not available, the server system 204 generates a consent token associated with enrollment identifier and the user consent message received from the first merchant 202*a*. The consent token may include (among other things), as described above, an enrolment ID specific to the user 208 and the first merchant 202*a*, timestamp, the limited payment amount value, payment credential data, merchant id, etc. In other words, the consent token is an alphanumeric string that represents a consent by the user 208 to use the payment credential data for subsequent payment transactions at the first merchant 202*a*. More illustratively, the consent token may include: consent enrolment date/time, consent type (for example, frictionless. DAV/IDECx), payment credential data of the user, merchant name, enrolment time, enrollment identifier, device identifier, consent status (for example, granted or revoked), transaction identifier, etc.

In one embodiment, the server system 204 sends the consent enrolment request to the payment network 214 to perform consent verification process. Upon successful verification, the server system 204 generates the consent token associated with the user 208 and the first merchant 202*a*. In particular, the server system 204 sends the card profile data, personal profile data, and device profile data to the payment network 214 to perform consent verification process. The payment network 214 routes the consent verification request to issuer server 212 via the acquirer server 210.

At 416, the first merchant 202*a* may set access rules data associated with the consent token. The access rules data may include a merchant consent for sharing the consent token with a set of merchants to facilitate transactions at the one or more merchants using the same consent token. The merchant consent includes access permissions given to other merchant applications for accessing the consent token associated with the first merchant 202*a* and the user 208.

At 418, the first merchant 202*a* provides a merchant consent message to the server system 204. The merchant consent message includes a consent message from the first merchant 202*a* for allowing sharing of the consent token stored at the payment server 214 with selected merchants.

At 420, the server system 204 associates the access rules data set by the first merchant 202 in form of the merchant consent with access permissions of the consent token for other merchants.

At 422, the server system 204 stores the consent token and the access rules data in the consent database 220. Some examples of the access rules may be a threshold amount of transaction, a time-duration of validity of consent, a time of request made by the second merchant, geographical location of server of the second merchant, category of the second merchant, a number of attempts made by the merchant 2 to obtain consent token in pre-defined time interval (e.g., 1 month), etc.

FIGS. 5A and 5B, collectively, represent a sequence flow diagram 500 for a process flow of consent exchange or switching process among merchant applications of a plurality of merchants, in accordance with an embodiment of the present disclosure. The sequence of operations of the sequence flow diagram 500 may not be necessarily executed in the same order as they are presented. Further, one or more operations may be grouped together and performed in form of a single step, or one operation may have several sub-steps that may be performed in parallel or in a sequential manner. The user 208 opens a merchant application (i.e., merchant application 222*b*) associated with the second merchant 202*b* on the user device 208.

In one example, a user "John" has already given consents for two merchant applications (for example, merchant XYZ and PQR) and desires to perform payment transactions at a merchant "ABC". Hence, two different consent tokens C1 and C2 mapped to the user 208 are already stored in the consent database 220.

At 502, the server system 204 receives a request from the second merchant 202*b* to access available user consents (i.e. available consent tokens) associated with the user 208. The second merchant 202*b* may receive a purchase transaction request from the user device 206 of the user 208 via the second merchant application 222*b*

In the example, the merchant "ABC" sends a request to the server system 204 to access a consent token C1 or C2 associated with the user "John".

At 504, the server system 204 checks whether the consent token of the user 208 is available in the consent database 220 or not. The server system 204 runs a query in the consent database 220 to find the consent token of the user 208.

At 506, when the consent token of the user 208 is not available in the consent database 220, the server system 204 sends a notification to the merchant 202*b* to perform consent enrolment process for the user 208.

At 508, when the consent token of the user 208 is available, the server system 204 determines access rules data (i.e., merchant consent) set by a first merchant who has authorized to access the consent token. In other words, the server system 204 determines access permissions set by the first merchant 202*a* for accessing the consent token.

At 510, the server system 204 checks an access permission for the second merchant 202*b* of the consent token.

In one form, if the second merchant 202b does not have the access permission of the consent token associated with the first merchant 202a, at 512, the server system 204 sends a notification to request the second merchant 202b to initiate consent enrolment process for the user 208.

In another form, if the second merchant 202b has the access permission of the consent token associated with the first merchant 202a, at 514, the server system 204 sends a request to the user 208 to provide his/her consent to use the consent token of the first merchant 202a to perform payment transactions at the second merchant 202b. In the above example, it is assumed that the merchant XYZ has given access of its consent token C1 to the merchant "ABC". In this case, the server system sends a request to the user "John" to provide his consent whether he wants to share the consent token C1 with the merchant "ABC" or not.

At 516, based upon receiving the user consent, the server system 204 determines a set of authentication parameters associated with the user 208 by accessing real-time device data, real-time user authentication data, real-time merchant application behavior data, etc. from the user device 206. In the above example, the server system 204 then determines a set of authentication parameters associated with the user "John" in real-time.

At 518, the server system 204 generates an authentication score based on the set of authentication parameters.

At 520, the server system 204 checks whether the authentication score is greater than a threshold value or not.

If the authentication score is greater than the threshold value, at 522, the server system 204 shares the consent token associated with the first merchant 202a to the second merchant 202b for facilitating purchase transactions to the second merchant without providing any payment credential data on the second merchant application 222b.

If the authentication score is not greater than the threshold value, at 524, the server system 204 notifies the second merchant 202b indicating that the access for the consent token is not provided.

Figure 6:
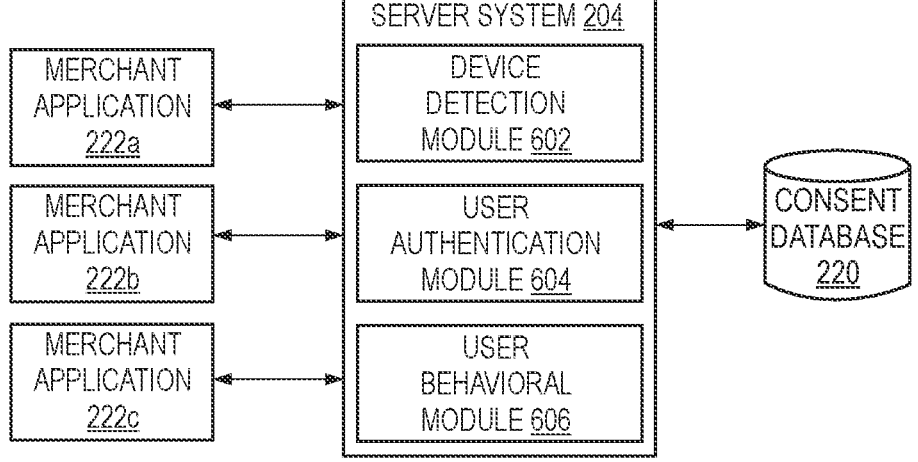
FIG. 6 shows an example representation of various modules included in the server system for behavioral consent evaluation process, in accordance with an embodiment of the present disclosure.

FIG. 6 shows an example representation 600 of various modules included in the server system 204 for behavioral consent evaluation process, in accordance with an embodiment of the present disclosure. As mentioned earlier, the second merchant 202b sends a request for accessing available consent token associated with the user 208 and the first merchant 202a to the server system 204 for facilitating purchase transaction on the merchant application 222b. Thereafter, the server system 204 is configured to determine a set of authentication parameters associated with the user 208 after opening a second merchant application in the user device. At high level, the set of authentication parameters includes device profile data, user authentication data, and application behavior data.

Based on the set of authentication parameters and the user consent available for the second merchant, the server system 204 is configured to share the same consent token with second merchant 202b.

In one embodiment, the server system 204 may include various modules for determining a set of authentication parameters. The various modules include a device detection module 602, a user authentication module 604, and a user behavioral module 606. It should be noted that the modules, described herein, can be configured in a variety of ways, including electronic circuitries, digital arithmetic and logic blocks, and memory systems in combination with software, firmware, and embedded technologies.

The server system 204 is configured to utilize the set of authentication parameters determined by the device detection module 602, the user authentication module 604, and the user behavioral module 606 to determine whether a repetitive consent enrolment process is required or not.

The device detection module 602 is configured to detect user device parameters such as, device location, device identifier, device health, counts of login attempts on any financial applications, etc. The device location data is captured using the GPS module present in the user device 206. The device identity is captured using email ID logged into a web browser and device registered email ID mapping. The behavior metrics data is captured through user device logs including successful and unsuccessful login to applications of last 24 hours. The device health data is captured by checking device information, device usage statistics, and Wi-Fi information. The behavioral pattern data is captured by gathering information regarding the huge number of unsuccessful attempts to log into a merchant application. In one example, if the device location is not within a particular defined range while accessing the consent token from the second merchant application 222b of the second merchant 202b, the device detection module 602 flags such consent token requests and denies access of the consent token to the second merchant 202b.

The device detection module 602 is configured to compare each user device parameter with a corresponding threshold value. Based on the comparison, the device detection module 602 is configured to generate a first authentication score.

The user authentication module 604 is configured to capture user data, user credential data, physical biometric data, out of band information, email data, SMS data, phone call data, and phone data of the user device 206 associated with the user 208. The user data captures the user information using the user device 206. The user credential data captures the payment related information of the user 208. The physical biometric data captures through the user device using one of: fingerprint scanner, iris scanner, face recognition, etc. The out-of-band information is captured by checking the network availability or the airplane mode behavior of the user device 206. The email data, SMS data, phone call data and phone data are captured by reading device logs and capturing scores against device logs and not storing the logs. The user authentication module 604 is configured to compare each data value with a corresponding threshold value. Based on the comparison, the user authentication module 604 is configured to generate a first authentication score.

The user behavioral module 606 is configured to capture user consent behavior data, application installation data, and application update data of the user device 206 associated with the user 208. The user consent behavior data is captured by determining if there are too many logins into the merchant application requesting for consent with different user identifiers on the user device with same IMEI and device configuration. The application installation data captures frequency of installing and uninstalling of an application on the user device in the last 24 hours or in a configurable time period. The application update data captures the number of updates received by the application in the last 24 hours or in a configurable time period on the user device. The user behavioral module 604 is configured to compare each data value with a corresponding threshold value. Based on the comparison, the user behavioral module 606 is configured to generate a third authentication score.

In one embodiment, the server system 204 is configured to determine an authentication score by aggregating the first, second, and third authentication scores and compare the authentication score with a threshold value. Based on the comparison, the server system 204 is configured to determine whether the consent enrolment request needs to be forwarded to the payment network 214 or not for consent verification.

Figure 7:
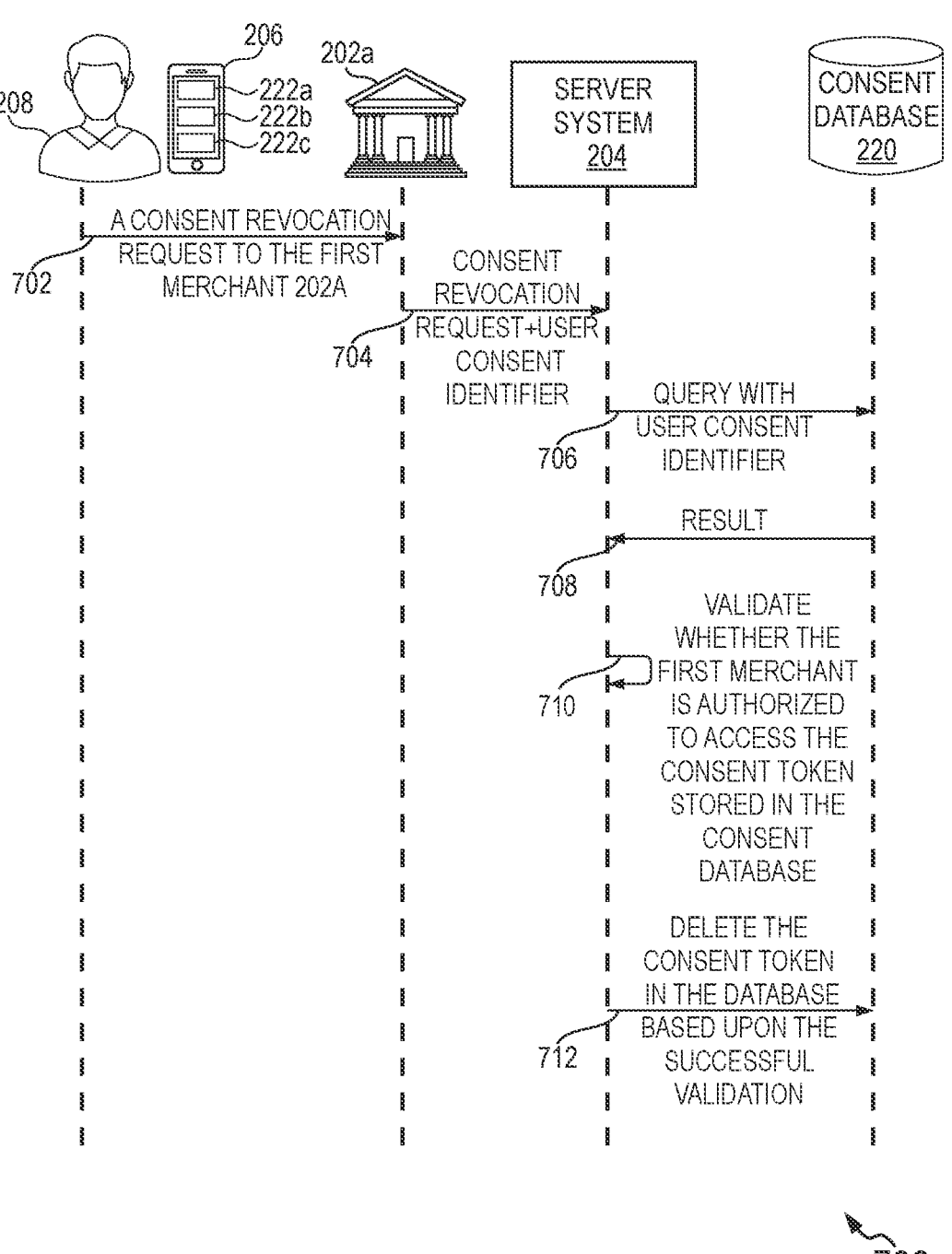
FIG. 7 is a sequence flow diagram of consent revocation method, in accordance with an embodiment of the present disclosure.

FIG. 7 represents a sequence flow diagram of consent revocation method, in accordance with an embodiment of the present disclosure. As mentioned earlier, the user provides user consent to the merchant which is stored by the merchant in a consent database to be used each time the user transacts with the merchant. The sequence of operations of the sequence flow diagram 700 may not be necessarily executed in the same order as they are presented. Further, one or more operations may be grouped together and performed in form of a single step, or one operation may have several sub-steps that may be performed in parallel or in a sequential manner.

At 702, the user 208 sends a consent revocation request to the first merchant 202a to revoke or delete previous consent provided by the user 208 for the first merchant 202a to utilize the stored payment credential data at the payment server 216 for purchase transactions.

At 704, the first merchant 202a sends the consent revocation request along with a user consent identifier to the server system 204.

At 706, the server system 204 sends a query with the user consent identifier to identify the consent token in the consent database 220.

At 708, the consent database 220 sends a result to the server system 204 according to the sent query.

In case the consent token is stored in the consent database 220, the result is the consent token and its associated data.

At 710, the server system 204 validates whether the first merchant 202a is authorized to access the consent token stored in the consent database 220 or not.

If the first merchant 202a is authorized to access the consent token, at 712, the server system 204 sends a delete request to the consent database 220 to delete the consent token associated with the user 208 and the first merchant 202a.

FIG. 8 represents a flow diagram of a computer-implemented method 800 for managing user consents among a plurality of applications installed on a user device, in accordance with an embodiment of the present disclosure. The method 800 depicted in the flow diagram may be executed by the server system 102 which may be standalone server or a server as whole incorporated in another server system. Operations of the method 800, and combinations of operation in the method 800, may be implemented by, for example, hardware, firmware, a processor, circuitry and/or a different device associated with the execution of software that includes one or more computer program instructions.

In certain implementations, the method 800 may be performed by a single processing thread. Alternatively, the method 800 may be performed by two or more processing threads, each processing thread implementing one or more individual functions, routines, subroutines, or operations of the method. In an illustrative example, the processing threads implementing the method 800 may be synchronized (e.g., using semaphores, critical sections, and/or other thread synchronization mechanisms). Alternatively, the processing threads implementing the method 800 may be executed asynchronously with respect to each other. The method 800 starts at operation 802.

At 802, the method 800 includes storing, by a server system 102, a consent token associated with the user in a database 116 based, at least in part, upon receiving consent from the user 106 on the first application 110 to utilize user credential data for subsequent network transactions. The consent token includes the credential data associated with the user 102.

At 804, the method 800 includes receiving, by the server system 102, a request to access the consent token associated with the user 106 from a second application service provider 112 associated with a second application 114 accessible on the user device 104.

At 806, the method 800 includes determining, by the server system 102, whether the second application 110 is able to access the consent token associated with the first application based, at least in part, on access rules data set by the user 106 and the first application service provider 108 of the first application 110 for accessing the consent token.

At 808, the method 800 includes allowing, by the server system 102, access of the consent token to the second application 114 based, at least in part, on the determining step.

Figure 9:
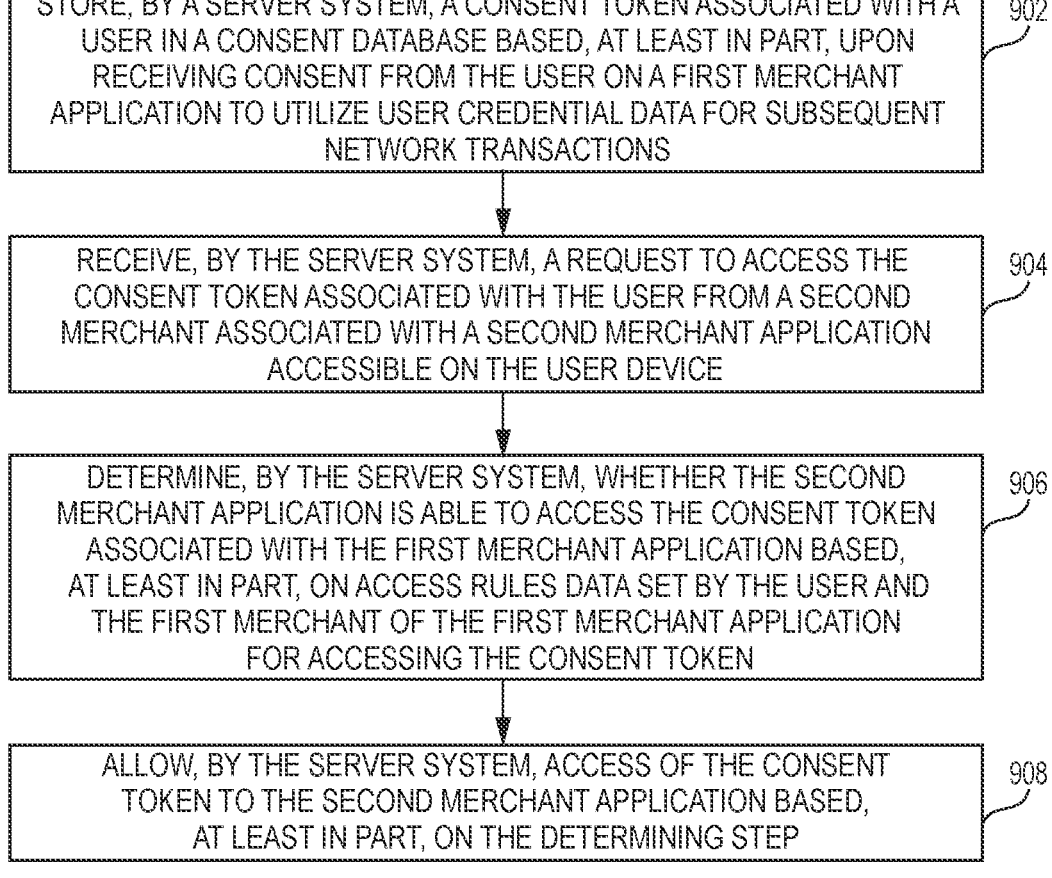
FIG. 9 is a flow diagram of a computer-implemented method for managing user consents among a plurality of merchant applications installed on a user device, in accordance with an embodiment of the present disclosure.

FIG. 9 is a flow diagram of a computer-implemented method 900 for managing user consents among a plurality of merchant applications installed on a user device, in accordance with an embodiment of the present disclosure. The method 900 depicted in the flow diagram may be executed by the server system 204 which may be standalone server or a server as whole incorporated in another server system. In another embodiment, the method 900 depicted in the flow diagram may be executed by the payment server 216 which may be standalone server or a server as whole incorporated in another server system. Operations of the method 900, and combinations of operation in the method 900, may be implemented by, for example, hardware, firmware, a processor, circuitry and/or a different device associated with the execution of software that includes one or more computer program instructions.

In certain implementations, the method 900 may be performed by a single processing thread. Alternatively, the method 900 may be performed by two or more processing threads, each processing thread implementing one or more individual functions, routines, subroutines, or operations of the method. In an illustrative example, the processing threads implementing the method 900 may be synchronized (e.g., using semaphores, critical sections, and/or other thread synchronization mechanisms). Alternatively, the processing threads implementing the method 900 may be executed asynchronously with respect to each other. The method 900 starts at operation 902. An interaction between the user device 206 of the user 208 and the first merchant 202a of a first merchant application 222a accessible on the user device 206 may cause generation of a consent token associated with the user 208 and the first merchant 202a.

At 902, the method 900 includes storing, by a server system 204, a consent token associated with the user 208 in a consent database 220 based, at least in part, upon receiving consent from the user 208 on the first merchant application 222a to utilize user credential data for subsequent network transactions, the consent token includes the credential data associated with the user 208.

At 904, the method 900 includes receiving, by the server system 204, a request to access the consent token associated with the user 208 from a second merchant 202b associated with a second merchant application 222b accessible on the user device 206.

At 906, the method 900 includes determining, by the server system 204, whether the second merchant application 202b is able to access the consent token associated with the first merchant application based, at least in part, on access level data set by the user 208 and the first merchant 202*a* of the first merchant application 222*b* for accessing the consent token.

At 908, the method 900 includes allowing, by the server system 204, access of the consent token to the second merchant application 202*b* based, at least in part, on the determining step.

The method 900 further includes discarding a consent enrolment request received from the first merchant 202*a* based, at least in part, on an authentication score and a consent status (i.e., availability status) of the consent token associated with the user 208 and the first merchant 202*a*. The consent enrolment request is received from the first merchant at a timestamp after re-installing of the first merchant application 222*a* in the user device 202*a*. The authentication score is calculated based at least on a set of authentication parameters detected at the timestamp.

In an example, the user 208 has installed 3 different merchant applications on the user device 206 (i.e., smartphone). The user 208 has enrolled to all the three different merchant applications and has provided user consent to a first merchant application. The same user consent can be accessed by other two merchant applications on the user device 206 even if the first merchant application is deleted from the user device 206.

Figure 10:
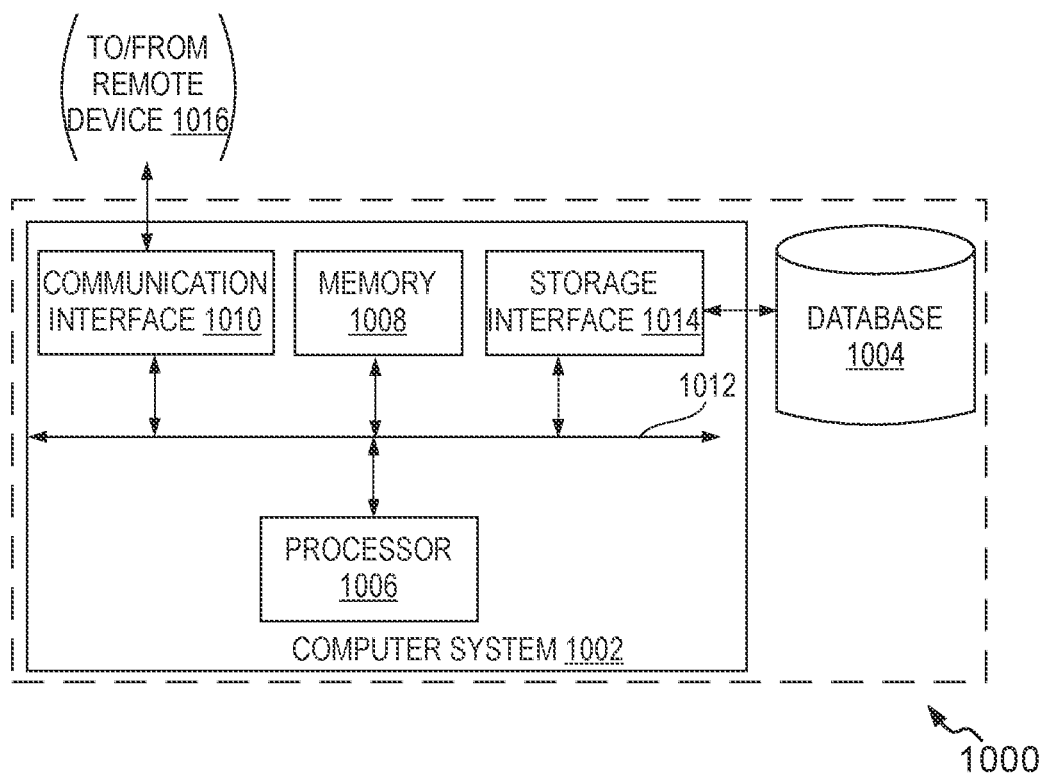
FIG. 10 is a simplified block diagram of a server system, in accordance with an embodiment of the present disclosure.

Referring now to FIG. 10, a simplified block diagram of a server system 1000 is shown, in accordance with an embodiment of the present disclosure. The server system 1000 is similar to the server system 204 or the server system 102. In some embodiments, the server system 1000 is embodied as a cloud-based and/or SaaS-based (software as a service) architecture.

In one embodiment, the server system 1000 includes a computer system 1002 and a database 1004. The computer system 1002 includes at least one processor 1006 for executing instructions, a memory 1008, and a communication interface 1010. The one or more components of the computer system 1002 communicate with each other via a bus 1012.

In some embodiments, the database 1004 is integrated within the computer system 1002. For example, the computer system 1002 may include one or more hard disk drives as the database 1004. A storage interface 1014 is any component capable of providing the processor 1006 with access to the database 1004. The storage interface 1014 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1006 with access to the database 1004. In one embodiment, the database 1004 is configured to store consent tokens of users and encrypted payment credential data associated with the consent tokens.

The processor 1006 includes suitable logic, circuitry, and/or interfaces to execute computer readable instructions for managing and sharing user consents among multiple applications installed on a user device. Examples of the processor 1006 include, but are not limited to, an application-specific integrated circuit (ASIC) processor, a reduced instruction set computing (RISC) processor, a complex instruction set computing (CISC) processor, a graphical processing unit (GPU) processor, a field-programmable gate array (FPGA), and the like. The memory 1008 includes suitable logic, circuitry, and/or interfaces to store a set of computer readable instructions for performing operations. Examples of the memory 1008 include a random-access memory (RAM), a read-only memory (ROM), a removable storage drive, a hard disk drive (HDD), and the like. It will be apparent to a person skilled in the art that the scope of the disclosure is not limited to realizing the memory 1008 in the server system 1000, as described herein. In another embodiment, the memory 1008 may be realized in the form of a database server or a cloud storage working in conjunction with the server system 1000, without departing from the scope of the present disclosure.

The processor 1006 is operatively coupled to the communication interface 1010 such that the processor 1006 is capable of communicating with a remote device 1016, or communicated with any entity connected to the network 118 or 218 (as shown in FIG. 1). It is noted that the server system 1000 as illustrated and hereinafter described is merely illustrative of an apparatus that could benefit from embodiments of the present disclosure and, therefore, should not be taken to limit the scope of the present disclosure. It is noted that the server system 1000 may include fewer or more components than those depicted in FIG. 10.

Figure 11:
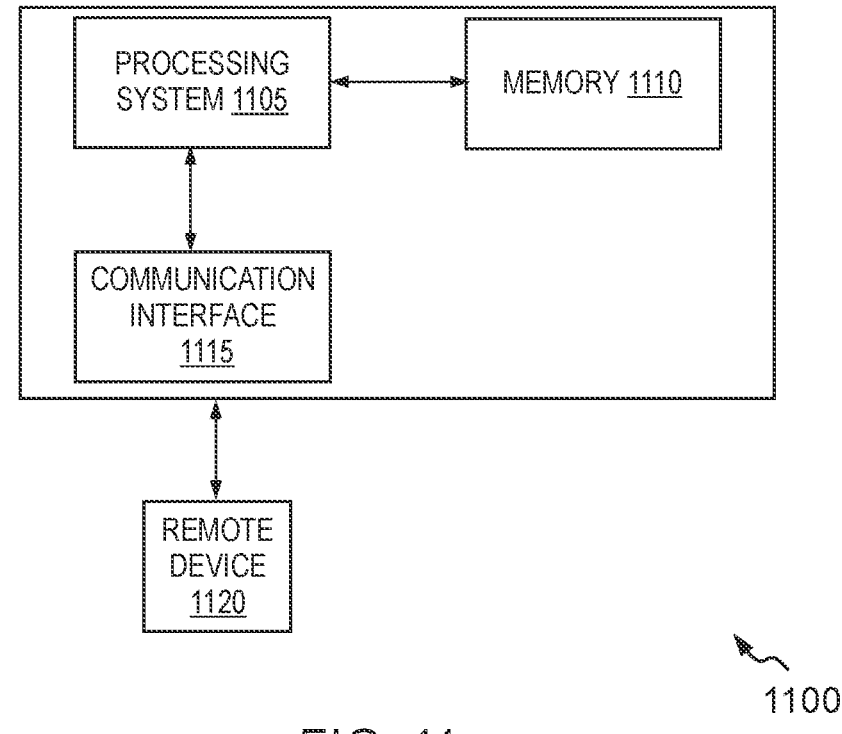
FIG. 11 is a simplified block diagram of a payment server, in accordance with an embodiment of the present disclosure.

FIG. 11 is a simplified block diagram of a payment server 1100, in accordance with an embodiment of the present disclosure. The payment server 1100 is an example of the payment server 216 of FIG. 2. A payment network may be used by the payment server 1100 as a payment interchange network. Examples of payment interchange network include, but not limited to, Mastercard® payment system interchange network. The payment server 1100 includes a processing system 1105 configured to extract programming instructions from a memory 1110 to provide various features of the present disclosure. Further, two or more components may be embodied in one single component, and/or one component may be configured using multiple sub-components to achieve the desired functionalities. Some components of the payment server 1100 may be configured using hardware elements, software elements, firmware elements and/or a combination thereof. In one embodiment, the payment server 1100 is configured to determine authenticity of the payment card based on the card image and send a payment transaction request to the issuer server 212 via the acquirer server 210 and the payment network 214.

Via a communication interface 1115, the processing system 1105 receives a payment authorization request from a remote device 1120 such as the server system 204, the acquirer server 210, or administrators managing server activities. The payment server 1100 may also perform similar operations as performed by the server system 204. For the sake of brevity, the detailed explanation of the payment server 1100 is omitted herein with reference to the FIG. 10.

Figure 12:
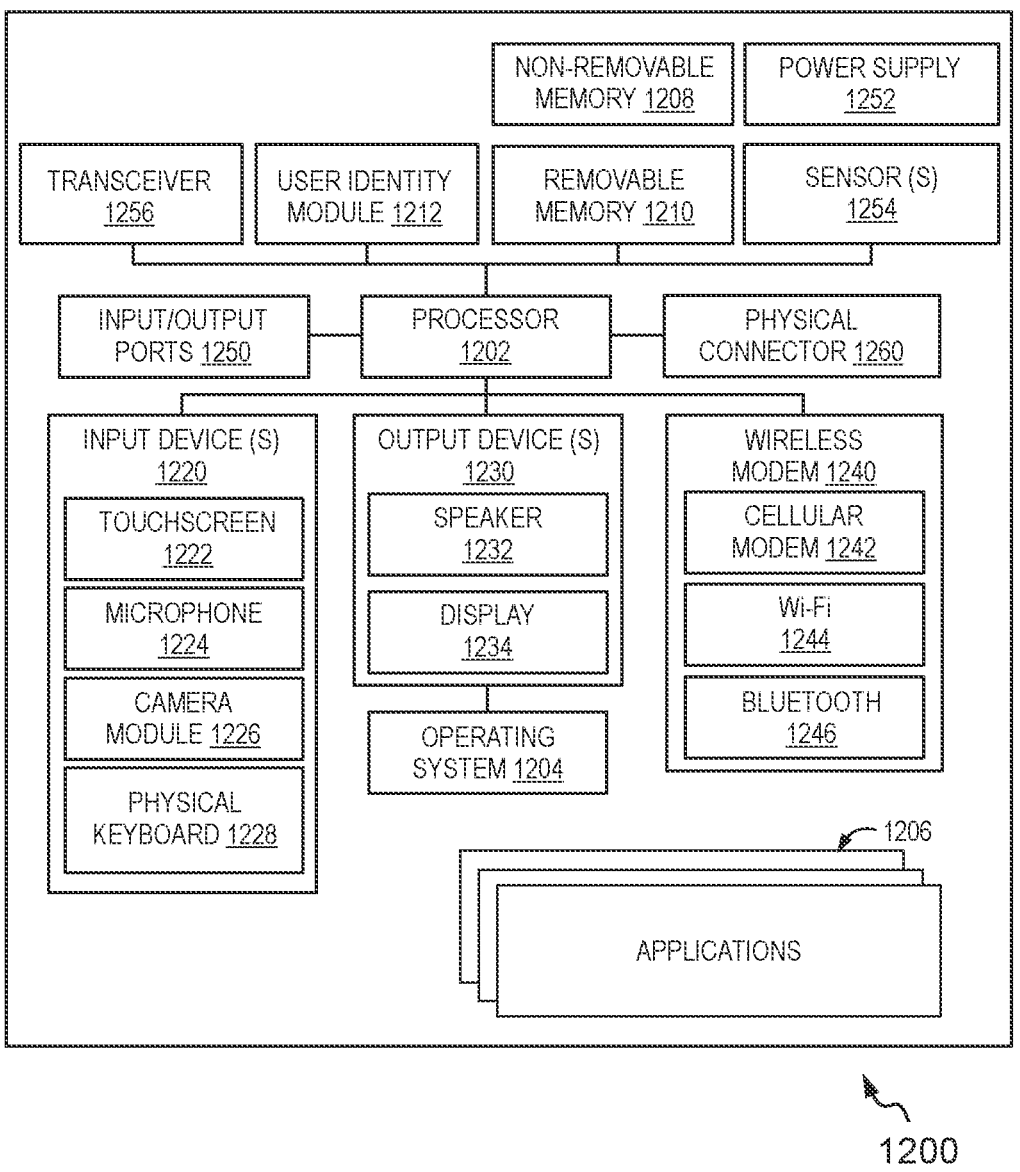
FIG. 12 is a simplified block diagram of a user device capable of implementing the various embodiments of the present disclosure.

FIG. 12 is a simplified block diagram of a user device 1200, for example a mobile phone or a desktop computer, capable of implementing the various embodiments of the present disclosure. For example, the user device 1200 may correspond to the user device 104 of FIG. 1. In one embodiment for example, the user device 1200 may correspond to the user device 206 of FIG. 2 The user device 1200 is depicted to include one or more applications such as the applications 1206. In one embodiment the applications 1206 includes the first application and the second application. In another embodiment, the applications 1206 includes the first merchant application and the second merchant application. The applications 1206 can be an instance of an application downloaded from a third-party server or a merchant server. In an embodiment, the applications 1206 are capable of communicating with the server system 102 for facilitating transaction processing. In another embodiment, the applications 1206 are capable of communicating with the server system 204 for facilitating payment transaction processing.

It should be understood that the user device 1200 as illustrated and hereinafter described is merely illustrative of one type of device and should not be taken to limit the scope of the embodiments. As such, it should be appreciated that at least some of the components described below in connection with the user device 1200 may be optional and thus in an example embodiment may include more, less or different components than those described in connection with the example embodiment of the FIG. 12. As such, among other examples, the user device 1200 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the user device 1200 and supports for one or more payment applications programs (see, applications 1206) such as the payment gateway application and merchant applications, that implement one or more of the innovative features described herein. In addition, applications 1206 may include common mobile computing applications (e.g., telephony applications, email applications, calendars, contact managers, web browsers, and messaging applications) or any other computing application.

The illustrated user device 1200 includes one or more memory components, for example, a non-removable memory 1208 and/or removable memory 1210. The non-removable memory 1208 and/or the removable memory 1210 may be collectively known as a database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and applications 1206. The user device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) Systems, or with third-generation (3G) wireless communication protocols such as Universal Mobile Telecommunications System (UMTS), CDMA11000, wideband CDMA (WCDMA) and time division-synchronous CDMA (TD-SCDMA), or with fourth-generation (4G) wireless communication protocols such as LTE (Long-Term Evolution).

The user device 1200 can support one or more input devices 1220 and one or more output devices 1230. Examples of the input devices 1220 may include, but are not limited to, a touch screen/a display screen 1222 (e.g., capable of capturing finger tap inputs, finger gesture inputs, multi-finger tap inputs, multi-finger gesture inputs, or key-stroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited to, a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the user device 1200 and a public switched telephone network (PSTN).

The user device 1200 can further include one or more input/output ports 1250, a power supply 1252, one or more sensors 1254 for example, an accelerometer, a gyroscope, a compass, or an infrared proximity sensor for detecting the orientation or motion of the user device 1200 and biometric sensors for scanning biometric identity of an authorized user, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

The disclosed methods with reference to FIGS. 8 and 9, or one or more operations of the server system 1000 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1000 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM. PROM (programmable ROM). EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A method comprising:
receiving, by a first merchant computer, an enrollment request from a first merchant application on a user device;
receiving, by the first merchant computer, a user consent message from the user device;
receiving, by the first merchant computer, user credential data for the user device from the user device, wherein the user credential data for the user device comprises a payment card;
transmitting, by the first merchant computer, the user consent message and the user credential data to a server system;
generating, by the server system, a consent token, wherein the consent token comprises the user credential data and the user consent message;
storing, by the server system, the consent token in a consent database;
receiving, by the server system, access rules from the first merchant computer, wherein the access rules define use of the consent token for a set of other merchant computers including a second merchant computer;
storing, by the server system, the access rules in the consent database;
receiving, by the second merchant computer, a purchase transaction request from the user device;
transmitting, by the second merchant computer to the server system, a request to access the consent token;
receiving, by the server system, the request to access the consent token from the second merchant computer;
verifying, by the server system, access to the consent token from the second merchant computer based on the access rules;
transmitting, by the server system, to the user device a request for a user consent message to access the consent token for the second merchant computer;
receiving, by the server system, consent from the user device for the second merchant computer to access the consent token;
transmitting, by the server system, the consent token to the second merchant computer; and
storing, by the second merchant computer, the consent token.

2. The computer-implemented method of claim 1, further comprising verifying the user credential data by sending a consent verification request to a payment server associated with a payment network.

3. The computer-implemented method of claim 1, further comprising: associating, by the server system, the access rules data with the consent token.

4. The computer-implemented method of claim 1, wherein the consent token comprises payment credential data associated with the user, information of the first merchant application service provider, an enrollment identifier, enrollment time and a limited payment amount.

5. The computer-implemented method of claim 1, further comprising:

calculating, by the server system, an authentication score by aggregating authentication scores associated with a set of authentication parameters;

determining, by the server system, whether the authentication score is greater than a threshold value or not; and in response to determining that the authentication score is greater than the threshold value, sharing, by the server system, the consent token with the second merchant application service provider to process the purchase transaction request.

6. A system comprising:

a first merchant computer comprising:

a first communication interface;

a first processor coupled to the first communication interface;

a first memory storing executable instructions which, when executed by the first processor, cause the first processor to perform operations of:

receiving an enrollment request from a first merchant application on a user device;

receiving a user consent message from the user device;

receiving user credential data for the user device from the user device, wherein the user credential data for the user device comprises a payment card; and transmitting the user consent message and the user credential data to a server system;

the server system comprising:

a server communication interface;

a server processor coupled to the server communication interface; and a server memory storing executable instructions which, when executed by the server processor, cause the server processor to perform operations of:

receiving the user consent message and the user credential data for the user device from the first merchant computer;

generating a consent token, wherein the consent token comprises the user credential data and the user consent message;

storing the consent token in a consent database;

receiving access rules from the first merchant computer defining the use of the consent token for a set of other merchant computers including a second merchant computer;

storing the access rules in the consent database;

receiving a request to access the consent token from the second merchant computer;

verifying access to the consent token from the second merchant computer based on the access rules;

transmitting to the user device a request for a user consent message to access the consent token by the second merchant computer;

receiving the user consent message from the user device for the second merchant computer to access the consent token; and transmitting the consent token to the second merchant computer;

a second merchant computer comprising:

a second communication interface;

a second processor coupled to the second communication interface;

a second memory storing executable instructions which, when executed by the second processor, cause the second processor to perform operations of:

receiving a purchase transaction request from the user device;

transmitting, to the server system, the request to access the consent token; and storing the consent token received from the server system.

7. The system of claim 6, wherein the executable instructions in the server memory, when executed by the server processor, cause the server processor to further perform operations of: verifying the user credential data including sending a consent verification request to a payment server associated with the payment network.

8. The system of claim 6, wherein the server processor: associates the access rules data with the consent token.

9. The system of claim 6, wherein the consent token comprises payment credential data associated with the user, information of the first merchant application service provider, an enrollment identifier, enrollment time and a limited payment amount.

10. The system of claim 6, wherein the server processor:

calculates an authentication score by aggregating authentication scores associated with a set of authentication parameters;

determines whether the authentication score is greater than a threshold value or not; and in response to determining that the authentication score is greater than the threshold value, share the consent token with the second merchant application service provider to process the purchase transaction request.

* * * * *